United States Patent [19]

Field

[11] Patent Number: 4,539,304

[45] Date of Patent: Sep. 3, 1985

[54] PRETREATMENT METHOD FOR INCREASING CONVERSION OF REFORMING CATALYST

[75] Inventor: Leslie A. Field, Emeryville, Calif.

[73] Assignee: Chevron Research Company, San Francisco, Calif.

[21] Appl. No.: 587,419

[22] Filed: Mar. 8, 1984

[51] Int. Cl.³ .......................... B01J 29/06; B01J 37/08
[52] U.S. Cl. ........................................ 502/66; 502/74; 502/85
[58] Field of Search ............................. 502/66, 74, 85

[56] References Cited

U.S. PATENT DOCUMENTS

| | | | |
|---|---|---|---|
| 3,527,836 | 9/1970 | Turner et al. | 502/74 X |
| 3,640,819 | 2/1972 | Watkins | 502/74 X |
| 3,794,600 | 2/1974 | Schutt | 502/74 |
| 3,876,524 | 4/1975 | White et al. | 502/74 X |
| 4,191,632 | 3/1980 | Cosyns et al. | 502/66 |

Primary Examiner—Carl F. Dees
Attorney, Agent, or Firm—S. R. La Paglia; W. K. Turner; E. A. Schaal

[57] ABSTRACT

A pretreatment process is disclosed for increasing conversion of reforming catalysts wherein the catalyst is treated at from 120° C. to 260° C.; then the temperature of the treated catalyst is maintained at a temperature of from 370° C. to 600° C. in a reducing atmosphere prior to starting the hydrocarbon feed. Preferably, the catalyst is treated in the presence of hydrogen at atmospheric pressure for at least twenty minutes; then the temperature of the treated catalyst is maintained at 475° C. in a reducing atmosphere for at least ten minutes prior to starting the hydrocarbon feed.

16 Claims, 1 Drawing Figure

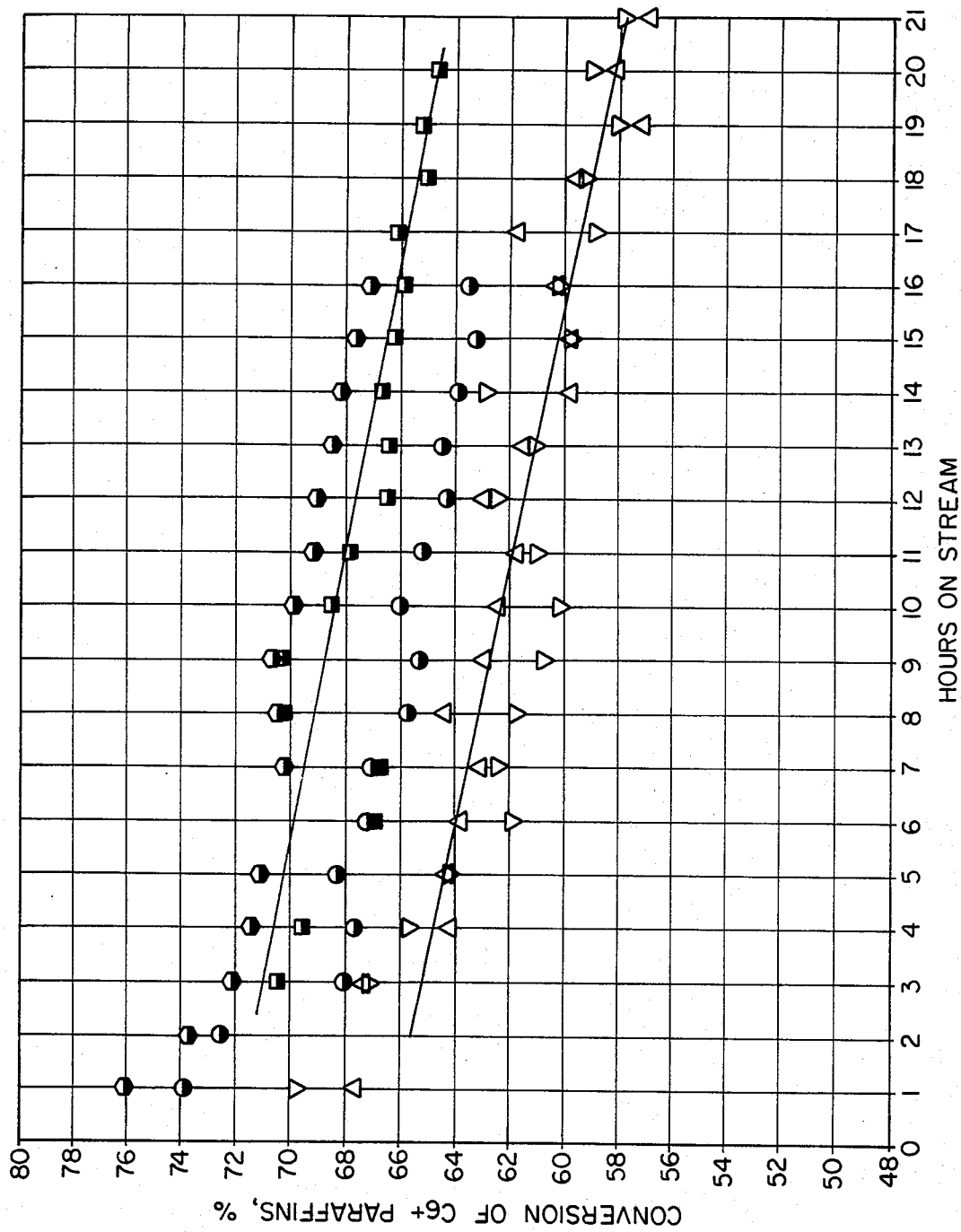

PRETREATMENT METHOD FOR INCREASING CONVERSION OF REFORMING CATALYST

BACKGROUND OF THE INVENTION

The present invention concerns a pretreatment method useful for increasing the conversion of a reforming catalyst.

Catalytic reforming is a well known process that is used for raising the octane rating of a naphtha for gasoline. The reactions that occur during reforming include: dehydrogenation of cyclohexanes, dehydroisomerization of alkylcyclopentanes, dehydrocyclization of acyclic hydrocarbons, dealkylation of alkylbenzenes, isomerization of paraffins, and hydrocracking of paraffins. The hydrocracking reaction should be suppressed because that reaction lowers the yield of hydrogen and lowers the yield of liquid products.

Reforming catalysts must be selective for dehydrocyclization, in order to produce high yields of liquid product and low yields of light gases. These catalysts should possess good activity, so that low temperatures can be used in the reformer. Also, they should possess good stability, so that they can maintain a high activity and a high selectivity for dehydrocyclization over a long period of time.

While most reforming catalysts contain platinum on an alumina support, large-pore zeolites have been proposed as supports. These large-pore zeolites have pores large enough for hydrocarbons in the gasoline boiling range to pass through. Catalysts based on these zeolitic supports have been commercially unsuccessful, but recently a new catalyst was developed. That catalyst comprises: a large-pore zeolite and a Group VIII metal. That catalyst has a very high selectivity for dehydrocyclization.

SUMMARY OF THE INVENTION

The present invention increases the conversion of reforming catalysts by a two-step pretreatment process. In the first step, the catalyst is treated in a reducing gas at a temperature of from 120° C. to 260° C. In the second step, the temperature of the catalyst is maintained at from 370° C. to 600° C. in a reducing atmosphere prior to starting the hydrocarbon feed.

Preferably, the first step occurs in the presence of hydrogen at atmospheric pressure for at least twenty minutes. Preferably, the second step occurs in the presence of hydrogen for from ten minutes to 24 hours.

BRIEF DESCRIPTION OF THE DRAWING

The appended drawing is supplied as an aid to the understanding of this invention. This drawing is only exemplary, and it should not be construed as limiting the invention. The drawing is a graph of conversion of $C_6+$ paraffins versus time on stream.

DESCRIPTION OF THE PREFERRED EMBODIMENTS

In its broadest aspect, the present invention involves pretreating a catalyst in a two-step process to increase conversion. In the first step, the catalyst is treated in a reducing gas at temperatures of from 120° C. to 260° C. In the second step, the temperature of the catalyst is maintained at from 370° C. to 600° C. in a reducing atmosphere. By the use of this two-step process to pretreat the catalyst, one can get an improvement in conversion over that obtained after a one-step treatment in a reducing atmosphere at temperatures greater than 260° C.

In the first step, the catalyst is treated in a reducing atmosphere at from 120° C. to 260° C. Although other reducing gases can be used, a preferred reducing gas is hydrogen. Preferably, this first step occurs in the presence of hydrogen at atmospheric pressure or higher for at least twenty minutes.

In the second step, the temperature of the catalyst is maintained at from 370° C. to 600° C. in a reducing atmosphere prior to starting the hydrocarbon feed. Although other reducing gases can be used, a preferred reducing gas is hydrogen. Preferably, this second step occurs in the presence of hydrogen for from ten minutes to 24 hours.

The feed is a naphtha that contains at least some acyclic hydrocarbons or alkylcyclopentanes. This feed should be substantially free of sulfur, nitrogen, metals, and other known poisons. These poisons can be removed by first using conventional hydrofining techniques, then using sorbents to remove the remaining sulfur compounds.

The feed can be contacted with the catalyst in either a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be either upward, downward, or radial. The pressure is from about 1 atmosphere to about 500 psig, with the preferred pressure being from about 50 psig to about 200 psig. The preferred temperature is from about 430° C. to about 550° C. The liquid hourly space velocity (LHSV) is from about 0.1 $hr^{-1}$ to about 10 $hr^{-1}$ with a preferred LHSV of from about 0.3 $hr^{-1}$ to about 5 $hr^{-1}$. Enough hydrogen is used to insure an $H_2/HC$ ratio of up to about 20:1. The preferred $H_2/HC$ ratio is from about about 1:1 to about 6:1. Reforming produces hydrogen. Thus, additional hydrogen is not needed except when the catalyst is pre-reduced and when the feed is first introduced. Once reforming is underway, part of the hydrogen that is produced is recycled over the catalyst.

The catalyst is a large-pore zeolite charged with at least one Group VIII metal. The preferred Group VIII metal is platinum, which is more selective for dehydrocyclization and which is more stable under reforming reaction conditions than other Group VIII metals. The catalyst should contain between 0.1% and 5% platinum of the weight of the catalyst, preferably from 0.1% to 1.5%.

The term "large-pore zeolite" is defined as a zeolite having an effective pore diameter of from 6 to 15 Angstroms. The preferred pore diameter is from 7 to 9 Angstroms. Type L zeolite, zeolite X, and zeolite Y are thought to be the best large-pore zeolites for this operation. Type L zeolite is described in U.S. Pat. No. 3,216,789. Zeolite X is described in U.S. Pat. No. 2,882,244. Zeolite Y is described in U.S. Pat. No. 3,130,007. U.S. Pat. Nos. 3,216,789; 2,882,244; and 3,130,007 are hereby incorporated by reference to show zeolites useful in the present invention. The preferred zeolite is type L zeolite.

Type L zeolites are synthesized largely in the potassium form. These potassium cations are exchangeable, so that other type L zeolites can be obtained by ion exchanging the type L zeolite in appropriate solutions.

It is difficult to exchange all of the original cations, since some of these cations are in sites which are difficult to reach. Preferably, the potassium is ion exchanged with an alkaline earth metal, which can be either barium, strontium, or calcium. Barium is preferred because the resulting catalyst has a high activity, a high selectivity for dehydrocyclization, and a high stability. Preferably, the barium should constitute from 0.1% to 35% of the weight of the zeolite, more preferably from 1% to 20%.

An inorganic oxide can be used as a carrier to bind the large-pore zeolite. This carrier can be natural, synthetically produced, or a combination of the two. Preferred loadings of inorganic oxide are from 5% to 50% of the weight of the catalyst. Useful carriers include silica, alumina, aluminosilicates, and clays.

EXAMPLES

The invention will be further illustrated by the following examples which set forth a particularly advantageous method and composition embodiments. While the examples are provided to illustrate the present invention, they are not intended to limit it.

Three hundred grams of an L zeolite was added to a solution of 235.2 grams of $Ba(NO_3)_2$ in 3 liters of $H_2O$. The mixture was placed into closed containers and held at 80° C. for 3 hours. The contents were then filtered and then washed with 2 liters of $H_2O$. The solids were then dried at 250° F. overnight, and then calcined at 1100° F., in air, for 16 hours.

Two hundred grams of the solids were then impregnated with 32.4 ml of a solution of $Pt(NH_3)_4(NO_3)_2$ which contained 0.0419 grams Pt/ml, in 153 ml of $H_2O$. This mixture was left for 2 hours at room temperature, and then dried overnight at 250° F., and finally calcined for 2 hours at 500° F. in air.

The feed used in runs to test the catalyst contained 80.5 LV% paraffins, 17% naphthenes, and 2% aromatics. The feed density was 72.1° API. The feed boiling range, as measured by D-86 distillation, was 157° F. start, 162 5% point, 166 10%, 169 20%, 172 30%, 175 40%, 178 50%, 182 60%, 187 70%, 194 80%, 205 90%, 210 95%, and 229° F. endpoint.

One cc of the catalyst described above was screened to between 24 and 80 mesh and placed in a tubular reactor. Alundum was packed in the reactor above and below the catalyst. The catalyst was then treated with flowing hydrogen at atmospheric pressure and approximately 500 standard cc/minute flow at 700° F. for thirty minutes. The catalyst temperature was then increased to 920° F. and the catalyst held in flowing $H_2$ for 1 hour. The pressure was then increased to 100 psig, the $H_2$ rate slowed to 120 cc/minute; and the hydrocarbon feed described above was introduced at 6 cc/hour. The catalyst temperature was maintained at 920° F. Samples were taken of the product every hour and were analyzed by gas chromatography, using a thermal conductivity detector.

The results from these tests are shown as the unshaded points in the FIGURE.

Tests were run as described above, except that the catalyst was treated at 400° F. in flowing hydrogen for thirty minutes before the temperature was increased to 700° F., and held at this point for ten or thirty minutes, before proceeding as in the previous example.

The results from these tests are shown as the shaded points in the FIGURE.

While the present invention has been described with reference to specific embodiments, this application is intended to cover those various changes and substitutions which may be made by those skilled in the art without departing from the spirit and scope of the appended claims.

What is claimed is:

1. A method of pretreating a catalyst comprising:
   (a) treating said catalyst at from 120° C. to 260° C.; and
   (b) maintaining the temperature of the treated catalyst at from 370° C. to 600° C. in a reducing atmosphere.

2. A method of pretreating a catalyst according to claim 1 wherein step (a) occurs in the presence of hydrogen at atmospheric pressure for at least twenty minutes.

3. A method of pretreating a catalyst according to claim 2 wherein step (b) occurs in the presence of hydrogen for from ten minutes to 24 hours.

4. A method of pretreating a catalyst according to claim 3 wherein step (b) occurs for about ten minutes.

5. A method of pretreating a catalyst according to claim 1 wherein said catalyst comprises a large-pore zeolite containing at least one Group VIII metal.

6. A method of pretreating a catalyst according to claim 5 wherein said Group VIII metal is platinum.

7. A method of pretreating a catalyst according to claim 5 wherein said large-pore zeolite has an apparent pore size of from 7 to 9 Angstroms.

8. A method of pretreating a catalyst according to claim 7 wherein said large-pore zeolite is selected from the group consisting of zeolite X, zeolite Y, and type L zeolite.

9. A method of pretreating a catalyst according to claim 8 wherein said large-pore zeolite is a type L zeolite.

10. A method of pretreating a catalyst according to claim 1 wherein said catalyst comprises:
    (a) a large-pore zeolite containing platinum; and
    (b) an inorganic binder.

11. A method of pretreating a catalyst according to claim 10 wherein said inorganic binder is selected from the group consisting of silica, alumina, aluminosilicates, and clays.

12. A method of pretreating a catalyst according to claim 1 comprising:
    (a) reducing said catalyst in the presence of hydrogen at a temperature of 200° C. for at least twenty minutes; and
    (b) maintaining the temperature of the reduced catalyst at about 475° C. for at least ten minutes; wherein said catalyst comprises:
        (1) a type L zeolite containing from 0.1% to 1.5% by weight platinum; and
        (2) an inorganic binder selected from the group consisting of silica, alumina, aluminosilicates, and clays.

13. A method of pretreating a catalyst according to claim 5 wherein said catalyst contains an alkaline earth metal selected from the group consisting of barium, strontium, and calcium.

14. A method of pretreating a catalyst according to claim 13 wherein said alkaline earth metal is barium and wherein said Group VIII metal is platinum.

15. A method of pretreating a catalyst according to claim 14 wherein said catalyst has from 8% to 10% by weight barium and from 0.1% to 1.5% by weight platinum.

16. A method of pretreating a catalyst comprising:
(a) reducing said catalyst in the presence of hydrogen at a temperature of 200° C. for at least twenty minutes; and
(b) maintaining the temperature of the reduced catalyst at about 475° C. for at least ten minutes; wherein said catalyst comprises:
(1) a type L zeolite containing from 8% to 10% by weight barium and from 0.1% to 1.5% by weight platinum; and
(2) an inorganic binder selected from the group consisting of silica, alumina, aluminosilicates, and clays.

* * * * *